V. E. RUMBARGER.
CUSHION TIRE.
APPLICATION FILED MAY 16, 1908.

946,869.

Patented Jan. 18, 1910.

Witnesses
G. Howard Walmsley
Edward L. Reed

Inventor
Victor E. Rumbarger
By H. A. Toulmin,
Attorney

UNITED STATES PATENT OFFICE.

VICTOR E. RUMBARGER, OF DAYTON, OHIO.

CUSHION-TIRE.

946,869.

Specification of Letters Patent. Patented Jan. 18, 1910.

Application filed May 16, 1908. Serial No. 433,164.

*To all whom it may concern:*

Be it known that I, VICTOR E. RUMBARGER, a citizen of the United States, residing at State of Ohio, have invented certain new and useful Improvements in Cushion-Tires, of which the following is a specification, reference being had therein to the accompanying drawings.

This invention relates to cushion tires for wheels of automobiles and like vehicles, and the object of the invention is to provide a tire of this character which will have the necessary resiliency to enable it to absorb the shock incident to the irregularities of the road; which will not be liable to collapse as a result of either a heavy load or long use, thereby providing a tire which will have all the advantages of a pneumatic tire without being susceptible to the injuries common to that tire; and further, to provide adequate means for readily attaching such a tire to and detaching the same from the rim of the vehicle wheel.

With these objects in view my invention consists in certain novel features of construction and in certain parts and combinations hereinafter to be described, and then more particularly pointed out in the claims.

Figure 1:
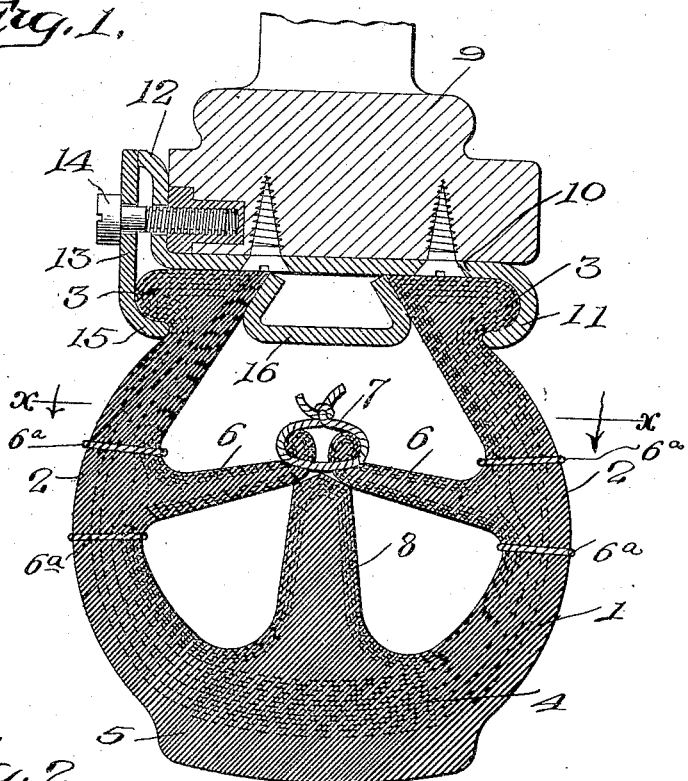
Figure 2:
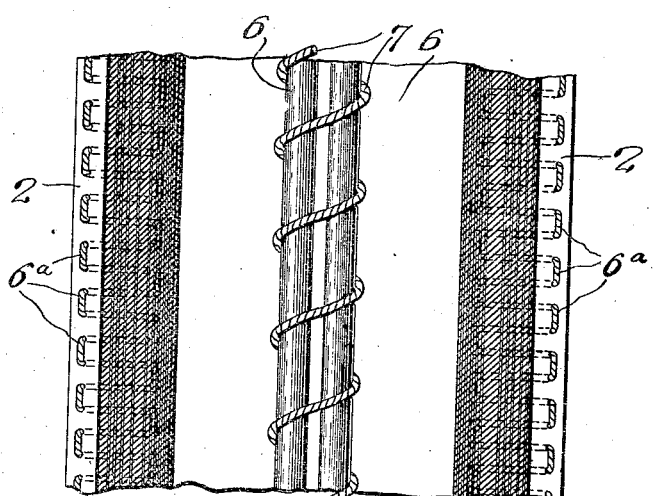

In the accompanying drawings, Figure 1 is a transverse sectional view of the rim of a wheel and a tire embodying my invention; and Fig. 2 is a longitudinal section of a portion of such a tire, taken on the line $x\ x$ of Fig. 1 and looking in the direction of the arrows.

In these drawings, I have illustrated the preferred form of my invention and have shown the same as comprising a body portion or tire proper 1 having side walls 2 provided near their inner edges with outwardly extending projections 3, and an outer wall 4 having the usual tread surface 5. Suitable means are provided for connecting the side walls 2 one to the other at a point removed from the inner edges thereof in such a manner as to prevent the same from spreading apart and permitting the tire to collapse. The term "inner edge", as herein used, designates that portion of the tire lying adjacent to and bearing against the outer surface of the supporting member or felly, and it will be understood that the above-mentioned means are connected to the side walls of the tire at points between the supporting felly and the tread of the tire. This means consists of inwardly extending members, such as the annular flanges 6, which are secured to the inner surfaces of the side walls 2, being preferably formed integral therewith, and are strengthened by stitching through said body portion, as shown at 6ª. These flanges extend inwardly to points near the center of the tire and are there connected one to the other, preferably by means of an ordinary lacing thong 7 which permits the flanges to be connected one to the other after the tire has been otherwise completed and forms a strong, firm connection between the two members.

A suitable inwardly extending projection, such as the radial rib 8, is carried by the inner surface of the outer wall 4 and is preferably formed integral with that outer wall. This rib extends inwardly to a point slightly beyond the points of connection of the flanges 6 to the side walls 2 and engages the outer sides of those flanges near their points of connection one to the other, the inner edge of the rib 8 being, in the present instance, beveled on its opposite sides to permit the same to fit snugly against the adjacent edges of the flanges. Inasmuch as the rib 8 engages the flanges 6 at a point beyond their points of connection to the side walls 2, it will be apparent that these flanges will extend at an acute angle to said rib and that they will serve not only to prevent the spreading of the side walls, but the strain imposed thereon by the rib 8 will come upon the outer portion of the side walls 2, that is, those portions of the side walls adjacent to the tread 5, and tend to draw the same toward the rim of the wheel. The inner edge of the rib 8 engages between the adjacent edges of the flanges 6 and tends to force the same apart and at the same time move the same inwardly, resisting the tendency of the side walls of the tire to move outwardly and thus placing the flanges 6 under a high tension and forming what is in effect a resilient diaphragm against which the upper edge of the rib 8 engages and which resists the upward movement of that rib and the outer wall or transverse portion 4 of the tire which carries the same. In this manner a strong, outward pressure is constantly exerted upon the outer wall, or transverse portion, 4 of the tire, which pressure is such as to allow the same to be compressed sufficiently to absorb the shock due to the irregularities in the road and which is also sufficient and of such a character as to cause the tire to instantly resume its normal position when the irregularity in the road has been passed, thereby forming what is known as a "live" tire. Thus, it will be seen that I have provided a tire which is practically a hollow tire having all the resiliency and advantages of a pneumatic tire without being dependent upon compressed air to maintain the same in its extended condition, this being accomplished by the connecting flanges 6 and the radial rib 8 which prevent the tire from collapsing, but, at the same time, allow the same sufficient resiliency to absorb the shock incident to the passage of the tire over an uneven road. It will also be apparent that a tire of this construction is not only unsusceptible to puncture and injuries of a like character, but that the same will be much more durable and will have a much longer term of service.

In order that this tire may be readily attached to and detached from the wheel I have provided the felly 9 of the wheel with a plate 10 which is secured to the outer surface thereof and has one side turned upon itself, as shown at 11, to form a recess adapted to receive one of the projections 3 carried by the side wall 2. The opposite side of the plate 10 is turned inwardly along the side of the felly 9 and then laterally, as shown at 12, to form a support for one edge of an annular plate or ring 13, which is detachably secured to the rim 9 by means of screws 14 and has its outer edge turned inwardly, as shown at 15, to engage the projection 3 of the other side wall of the tire and secure this projection in the recess formed between the inturned edge 15 and the plate 10. In order to retain the projections 3 within their respective recesses, I insert a suitable spacing member between the adjacent surface of the side walls near the inner edges thereof, and, in the present instance, I have shown this spacing member as comprising a rim or band 16 of metal having its edges bent inwardly to conform to the shape of the side walls 2 of the tire. This ring fits about the plate 10, which forms the outer surface of the felly 9, and is preferably loosely mounted thereon so that the same can be moved to one side to permit the projection 3 carried by the inner edge of the side wall 2 to be inserted in the recess formed in the bent-over portion 11 of the plate 10. The spacing member or ring 16 is then moved over against the inner surface of the adjacent edge of the side wall and the plate 13 is clamped against the opposite side wall thereof to engage the projection 3 of that side wall and clamp the same against the adjacent side of the spacing member 16, thus locking the tire securely in position on the rim, but in such a manner that the same can be readily removed therefrom.

I wish it to be understood that I do not desire to be limited to the details of construction shown and described, for obvious modifications will occur to a person skilled in the art.

Having thus fully described my invention, what I claim as new and desire to secure by Letters Patent, is:—

1. A tire of the character described comprising a body portion, a rib extending inwardly from the outer wall of said body portion, a flange extending inwardly from each of the side walls of said body portion, and means for connecting said flanges one to the other near the inner edge of said rib.

2. A tire of the character described comprising a body portion, a rib extending inwardly from the outer wall of said body portion, and flanges extending inwardly from the opposite side walls of said body portion and laced one to the other near the inner edges of said rib.

3. A tire of the character described comprising a body portion substantially U-shaped in cross section, a rib extending inwardly from the outer wall of said body portion, a separate flange extending inwardly from each of the side walls of said body portion and having its inner edge in engagement with said rib, and means for connecting the inner edges of said flanges one to the other.

4. A tire of the character described comprising a body portion substantially U-shaped in cross section, a separate flange extending inwardly from each of the side walls of said body at a point removed from the inner edge thereof, means for connecting said flanges one to the other, and a rib extending inwardly from the outer wall of said body portion and adapted to engage said flanges at a point beyond the points at which they are connected to said side walls.

In testimony whereof, I affix my signature in presence of two witnesses.

VICTOR E. RUMBARGER.

Witnesses:
EDWARD S. REED,
VERA W. BRETNEY.